United States Patent Office 2,703,812
Patented Mar. 8, 1955

2,703,812
CARBONATION OF RESORCINOL

Robert F. Bann, Somerville, and Robert C. Conn, Bound Brook, N. J., assignors to American Cyanamid Company, New York, N. Y., a corporation of Maine No Drawing. Application October 30, 1953,
Serial No. 389,459

8 Claims. (Cl. 260—521)

This invention relates to improved methods of preparing dihydroxy aromatic carboxylic acids and more particularly 2,4-dihydroxybenzoic acid and 4,6-dihydroxyisophthalic acid.

Organic Syntheses, Coll. vol. II, page 557, describes the preparation of beta-resorcylic acid by reacting resorcinol, $KHCO_3$ and water in an atmosphere of $CO_2$. Beta-resorcylic acid in yields of 57–60% of theory is stated to be obtained by this method. This preparative method utilizes 10 moles of water per mole of potassium bicarbonate and the accompanying note indicates that if less than this amount of water is used, the yield is diminished.

In accordance with the present invention, we have discovered that if the molar ratio of water to bicarbonate is reduced drastically, in direct contradistinction to the described method of the literature, the yield of beta-resorcylic acid may be increased up to 80%–90% of theory. According to the present invention, the molar ratio of water to potassium bicarbonate may range from zero up to a maximum of 2 moles per mole of bicarbonate. We have discovered that if the molar ratio of water exceeds about 2 moles per mole of potassium bicarbonate, the yield of beta-resorcylic acid diminishes greatly. In actual operating practice, we prefer to limit the amount of water to from zero to 0.5 moles of water per mole of potassium bicarbonate as these conditions have been found to give maximum yields.

The present invention may be carried out by reacting potassium carbonate and from 1 to 3 moles of water per mole of potassium carbonate with carbon dioxide to form potassium bicarbonate. The resulting mixture now containing from zero to 2 moles of water per mole of potassium bicarbonate is reacted with resorcinol in an atmosphere of carbon dioxide either at atmospheric pressure or under elevated pressure at a temperature of from about 100° C. to 125° C., preferably at 115° C., to form beta-resorcylic acid. When the resorcinol is carbonated at temperatures above 125° C., formation of 4,6-dihydroxyisophthalic acid becomes appreciable and at 180° C., 4,6-dihydroxyisophthalic acid is the exclusive product. It is not necessary, however, to prepare the potassium bicarbonate and then charge the resorcinol and carbonate as described above. If desired, potassium carbonate, resorcinol and the specified molar ratio of water may be mixed in a suitable reactor such as a ball mill while passing in carbon dioxide so as to form potassium bicarbonate in situ, which may then be heated with resorcinol and carbon dioxide as described above to form either beta-resorcylic acid or 4,6-dihydroxyisophthalic acid. Thus, while potassium bicarbonate may be charged to the reactor with resorcinol and then carbonating, there is an economic advantage in preparing the potassium bicarbonate in situ as described above. In either of these procedures, high yields of the desired end products are obtained.

It is an important advantage of the present invention that the described method of preparing potassium bicarbonate, that is, either in situ or at an earlier stage in the process by reaction of potassium carbonate, $CO_2$ and water, in effect permits the substitution of relatively inexpensive potassium carbonate for the more expensive potassium bicarbonate.

In a preferred embodiment of the present invention, the reaction is carried out in an atmosphere of carbon dioxide while simultaneously comminuting the mixture and venting the carbon dioxide to remove the excess water formed in the reaction. It is desirable to effect an intimate contact of the solid reactants with the carbon dioxide gas. Hence, any suitable equipment which will insure good contact may be used. A ball mill is preferred as it is simple and effective. However, any other suitable reaction vessel may be used.

The temperatures employed range from about 100° C.–125° C. and preferably 115° C. for the formation of beta-resorcylic acid. Above 125° C., increasing amounts of 4,6-dihydroxyisophthalic acid are formed, and this is the exclusive product at 180° C.

The reaction time is not critical and will vary with the size of the batch and nature of the equipment used. The reaction is carried out until a sample indicates that conversion to the desired end product is substantially complete.

The yields of beta-resorcylic acid obtained by the described process range from about 70% of theory when operating with 2 moles of water per mole of bicarbonate, to about 85% of theory when the molar ratio is zero, which yields are in marked contrast to the 57% yield of the prior art process utilizing large amounts of water in the charge.

The invention will be described in greater detail in conjunction with the following specific examples in which the parts are by weight unless otherwise specified.

Example 1

152 parts of calcined potassium carbonate, 19.8 parts of water and 55 parts of resorcinol are charged to a ball mill containing an assortment of balls and angle irons. Air is purged from the mill by passing in $CO_2$. The mill is then closed and pressured with $CO_2$ to 25 pounds. Heat is applied to the rotating mill and the charge is heated to 115° C. over 20–30 minutes. The temperature is maintained at 115° C. for 4½ hours after which the charge is cooled to room temperature while still under $CO_2$ pressure.

1020 parts of water at 60° C. are used to dissolve the finely divided mill product which is then clarified with the aid of 20 parts of decolorizing carbon. The filtrate is acidified with 246 parts of concentrated hydrochloric acid and after cooling to 5° C. the beta-resorcylic acid which precipitates in small needles is filtered off, washed free of minal acid and dried at 110° C. Good quality beta-resorcylic acid in a yield of 67.7% is obtained.

If the reaction is conducted at 130° C., some 4,6-dihydroxyisophthalic acid is obtained and at 180° C., this is the exclusive product.

Example 2

152 parts of calcined potassium carbonate and 19.8 parts of water are combined in a ball mill and mixed for two hours at room temperature under $CO_2$ pressure of 25 pounds. At the end of this time the charge assays 11.0% $K_2CO_3$ and 89% $KHCO_3$.

55 parts of resorcinol are added to the $KHCO_3$ prepared in this manner and after air is purged from the mill by passing in $CO_2$, the tool is pressured to 25 pounds with $CO_2$. The charge is heated to 115° C. over about 30 minutes and held at that temperature for 4½ hours while under $CO_2$ pressure of 25 pounds. After cooling to room temperature, the charge is dissolved and worked up as described under Example 1. A product of excellent quality in 80% yields is obtained.

Example 3

152 parts of calcined potassium carbonate and 19.8 parts of water are charged to a ball mill containing an assortment of balls and angle irons and the charge is mixed under an atmosphere of $CO_2$ for two hours at room temperature. At the end of this time, the charge assays 100% $KHCO_3$.

55 parts of resorcinol are added to the $KHCO_3$ prepared above and the mixture is heated at 115° C. for 4½ hours while passing in $CO_2$. The reaction is cooled to room temperature, dissolved in water and worked up as described in Example 1. A 70.7% yield of good quality beta-resorcylic acid is obtained.

Example 4

76 parts of calcined potassium carbonate, 11.7 parts of water and 55 parts of resorcinol are charged to a ball mill containing an assortment of balls and angle irons. This charge is heated at 80° C. for 2⅓ hours while passing in $CO_2$. Then the temperature is raised to 115° C. over about 30 minutes and held for 4½ hours while $CO_2$ is passed continuously through the mill.

After cooling to room temperature, the reaction mass is dissolved in 400 parts of water at 65° C. and acidified with 110 parts of concentrated HCl. The resulting slurry is cooled to 15° C. and the beta-resorcylic acid is filtered off, washed free of mineral acid and dried at 110° C. A 78.2% yield of good quality beta-resorcylic acid is obtained.

*Example 5*

213 parts of water and 1383 parts of calcined potassium carbonate are reacted in a ball mill with $CO_2$ to form potassium bicarbonate. 1000 parts of resorcinol are added and the mixture heated at 115° C. for 6½ hours. The milled product is discharged as a free-flowing powder or as a water solution, and may then be worked up by precipitating the beta-resorcylic acid as in Example 1. A 76.3% yield of good quality beta-resorcylic acid is obtained.

*Example 6*

27 parts of water, 110 parts of $KHCO_3$ and 55 parts of resorcinol are heated at 115° C. for 4½ hours in a ball mill while passing in $CO_2$. A 68.5% yield of good quality beta-resorcylic acid is obtained.

*Example 7*

The procedure of Example 6 is repeated except that no water is added to the charge. An 80.2% yield of good quality beta-resorcylic acid is obtained.

We claim:

1. A process of carbonating resorcinol which comprises heating a mixture of resorcinol, potassium bicarbonate and water in an amount ranging from zero to two moles of water per mole of potassium bicarbonate in an atmosphere of carbon dioxide at a temperature of from about 100° C. to 125° C. so as to form beta-resorcylic acid.

2. A process according to claim 1 in which the temperature is maintained at about 180° C. so as to form 4,6-dihydroxyisophthalic acid.

3. A process according to claim 1 in which the reaction mixture is simultaneously comminuted during heating and in which the carbon dioxide is vented to remove excess water formed in the reaction.

4. A process according to claim 2 in which the reaction mixture is simultaneously comminuted during heating and in which the carbon dioxide is vented to remove excess water formed in the reaction.

5. A process of carbonating resorcinol which comprises heating a mixture of resorcinol, potassium carbonate and water in an amount ranging from one to three moles of water per mole of potassium carbonate in an atmosphere of carbon dioxide so as to form potassium bicarbonate in situ, and heating the potassium bicarbonate so formed with resorcinol in an atmosphere of carbon dioxide at a temperature of from about 100° C. to 125° C. so as to form beta-resorcylic acid.

6. A process according to claim 5 in which the temperature is maintained at about 180° C. so as to form 4,6-dihydroxyisophthalic acid.

7. A process according to claim 5 in which the reaction mixture is simultaneously comminuted during heating and in which the carbon dioxide is vented to remove excess water formed in the reaction.

8. A process according to claim 6 in which the reaction mixture is simultaneously comminuted during heating and in which the carbon dioxide is vented to remove excess water formed in the reaction.

References Cited in the file of this patent

Bistrzycki, Berichte, vol. 18, page 1985.
Organic Syntheses, Coll. vol. II, page 557.
Couturier, Ann. Chim. (11) 10, 570 (1938).